United States Patent

[11] 3,624,037

[72] Inventor Othmar Freitherr Von Ettingshausen
  Essen, Germany
[21] Appl. No. 810,385
[22] Filed Mar. 25, 1969
[45] Patented Nov. 30, 1971
[73] Assignee Th. Goldschmit, A. G.
  Essen, Germany

[54] PROCESS OF CURING AMINOPLASTS
  3 Claims, No Drawings
[52] U.S. Cl. .................................................. 260/67.6 R,
  156/331, 161/268, 161/270, 260/17.3 R, 260/29.4
  R, 260/69 R
[51] Int. Cl. .................................................. C08g 9/10,
  C08g 9/30

[50] Field of Search ........................................... 260/67.6,
  69, 29.4, 71

[56] References Cited
  UNITED STATES PATENTS
  3,317,474 5/1967 Jones ............................. 260/57
  3,434,985 3/1969 Becker ......................... 260/21

Primary Examiner—William H. Short
Assistant Examiner—Robert J. Koch
Attorney—McGlew and Toren ABSTRACT: Aminoplasts are cured in the presence of N-methylethanolamine acetate or di[N-methylethanolamine]-oxalate.

PROCESS OF CURING AMINOPLASTS

SUMMARY OF THE INVENTION

This invention relates to aminoplast manufacture and is particularly concerned with a process of curing or hardening aminoplast resins, in particular, melamine-formaldehyde and urea-formaldehyde resins.

According to the invention, certain organic salts of N-methylethanolamine have proved to be excellent hardeners for aminoplasts.

In the production of aminoplast resins, it is desired to harden or cure the resins in an optimum manner. The optimum curing, sometimes referred to in this art as the "maturing time" is effected under the action of pressure and heat and with the aid of hardeners as, for example, ammonium phosphate, ammonium chloride, perhydrol, amines or amine salts. This optimum curing or maturing time denotes the curing extent at which the molded piece, the casting or the multilayer structure exhibits its optimum characteristics in respect to resistance to stress cracking or crazing, scuff and abrasion resistance and lack of pores. Further, it is desired that the molded piece, casting or multilayer structure is readily removed from the respective manufacturing tool. With the customary prior art hardeners, it is generally extremely difficult to achieve an optimum maturing or curing so that the sum total of all the desired characteristics is obtained. This is so because the desired properties require to a certain extent contradictory conditions. Thus, for example, an optimum resistance to scuff and abrasion requires a hard and brittle surface while, by contrast, the most desirable stability against stress cracking is achieved by flexible, relatively soft aminoplasts.

Moreover, as is well known by those skilled in this art, the curing of aminoplast resins leads oftentimes to the formation of pores, the term "pore" as used herein being deemed to refer to very small craterlike depressions which are visible under a magnifying glass only.

Accordingly, it is a primary object of the present invention to provide a curing procedure for aminoplasts according to which optimum curing or maturing can be readily obtained in a relatively simple manner.

Another object of the invention is to provide a process for curing aminoplasts which results in aminoplasts of superior characteristics in respect to resistance to scuff and abrasion and to stability in respect to stress cracking or crazing.

Generally, it is an object of this invention to improve on the art of curing aminoplasts as presently practiced.

Briefly, and in accordance with the invention, it has surprisingly been ascertained that certain salts of N-methylethanolamine, to wit, N-methylethanolamine acetate and di[N-methylethanolamine]-oxalate possess characteristics which make them eminently suitable as hardeners for aminoplast resins. The beneficial hardening properties of these two salts are particularly pronounced in the hardening of melamine and urea resins. In accordance with the invention, it has been ascertained that the best results are obtained if the hardener salts are employed in quantities of 0.05 to 1.0 percent by weight, calculated on solid resins. Since the two hardeners referred to are readily soluble in water, they may be admixed with the customary aqueous solution of the resin forming system or the aqueous solution of the resin precondensate. If aminoplast resins are used for the production of pressure formed bodies, the hardening salts may be admixed in solid form with the solid precondensate.

The hardeners to be used in accordance with this invention have extremely high activity. For example, if carrier webs of paper or the like material are impregnated with the aqueous solutions of aminoplast resin precondensate, the heat treatment which is required for adjusting a predetermined condensation degree may be shortened by about 10 to 20 percent, if the respective solutions are admixed with the inventive hardening substances. This of course considerably increases the effectiveness and efficacy of the manufacturing units which are required for obtaining the necessary condensation degree. When the aminoplast-impregnated or coated carrier webs are then applied to, for example, wood or woodchip plates under pressure, the required press time for obtaining closed surfaces is considerably reduced. The surfaces obtained in this manner exhibit a much lower tendency to cracks and fissures and are substantially free of pores. This of course considerably reduces the soiling tendency of such surfaces. In spite of the reduced tendency to form cracks or fissures, the surface hardness and scuff and abrasion resistance, however, is not decreased.

The use of the inventive hardeners in the production of press masses shortens the press time considerably. The shaped articles have smooth and desirable surfaces.

The inventive hardeners may be prepared, for example, by adding to a 50 percent aqueous solution of acetic acid or oxalic acid an equimolar amount of N-methylethanol amine.

The invention will now be described by several examples, it being understood, however, that these examples are given by way of illustration and not by way of limitation, and that many changes may be effected without affecting in any way the scope and spirit of the invention as recited in the appended claims.

EXAMPLE 1

An aqueous melamine resin solution for impregnation purposes was prepared by condensation of melamine with formaldehyde (formalin 37 percent in a mole ratio of 1:1.8 until a turbidity point of 1:1.3 had been obtained. This resin solution was admixed with 0.5 percent of a 50 percent aqueous solution of N-methylethanolamine acetate. The acetate acts as hardener. Subsequently, a filled high quality cellulose paper with an area weight of 150 g./m.2 was impregnated with the resin solution until a final weight of 340 g./m.2. By precondensation at 130° C., the melamine resin impregnated paper was adjusted to a Darr moisture value of 4 percent. This paper was applied onto a woodchip board at a temperature of 145° C. and a pressure of 18 kp./cm.2. After a press time of 7 to 8 minutes, a substantially pore-free, closed and stress crack resistant surface was obtained. The laminate was removed from the press without any adhesion phenomena being observed.

EXAMPLE 2

The resin solution of example 1 was admixed with 0.5 percent of a 50 percent aqueous solution of di[N-methylethanolamine]-oxalate. An 80 g. high quality cellulose paper was subsequently impregnated with this melamine resin solution until the paper had a weight of 200 g. By precondensation at 130° C., the impregnated paper was brought to a Darr moisture value of 4.3 percent. The precondensate was then applied to a support surface at 145° C. and under a pressure of 18 kp./cm.2. Already after a press time of 7to minutes, a substantially pore-free, closed and crack-resistant surface was obtained. The laminated structure was removed from the press without the use of any separating agents and without any adhesion.

EXAMPLE 3

A 65 percent aqueous impregnating resin solution was prepared by condensation of melamine with formaldehyde, the formaldehyde being supplied partially as formalin 37 percent and partially as paraformaldehyde. The mole ratio of melamine to formaldehyde was 1:2. The solution also contained 7 mole percent of paratoluenesulfonamide. The condensation was conducted until a turbidity point of 1:0.8 had been reached. The modified melamine resin, without changing the condensation degree, was spray-dried. The dried melamine resin powder was admixed with 0.4 percent by weight of N-methylethanolamine acetate and 40 percent by weight of α-cellulose. The shaping was accomplished in a press tool at 150 kp./cm.2 pressure and 150° C. temperature and a press time of about 10 minutes. The pressed bodies thus obtained exhibited a surprisingly low tendency to form stress cracks and were substantially pore-free.

EXAMPLE 4

This example deals with the preparation of a decorative film, in which the first impregnation is performed with a resin solution consisting of 90 percent of urea resin A and 10 percent of melamine resin B, while the second impregnation was performed exclusively with the melamine resin B.

PREPARATION OF RESIN A 1.7 mole of a 30 percent formalin solution were adjusted to a pH value of 8.2 by addition of sodium hydroxide. One mole of urea was subsequently added to the system. The condensation was then performed at 90° C. until the viscosity of the resin solution was such that the discharge time of the solution from a DIN beaker with a 4 mm. nozzle amounted to 14 seconds. The urea resin was then cooled to 20° C. and the pH value was adjusted with phosphoric acid to 7.5.

PREPARATION OF RESIN B 1.8 mole of a 30 percent formalin solution were adjusted to a pH value of 8.3 with sodium hydroxide. Subsequently 1 mole of melamine was added to the formalin solution. The condensation was then effected at 95° C. until a water compatibility of 1:1.3 was obtained at 20° C. In determining the water compatibility, water was added in dropwise manner to 10 ml. of resin solution at 20° C. until a permanent turbidity could be observed. In the present case, 13 ml. of water were required in order to obtain a turbidity in 10 ml. of resin.

With a view to preparing a decorative film impregnated with aminoplast resins which later on was to be applied to a wooden base, a high quality cellulose paper was impregnated with a mixture of 90 parts of resin A and 10 parts of resin B, the mixture containing 0.7 percent of a 50 percent aqueous solution of N-methylethanolammonium acetate as hardener. After the impregnation and after an intermediate drying, the thus impregnated paper was coated with resin B, resin B containing 0.2 percent of N-methylethanolammonium acetate as hardener. The coating was carried out in such a manner that the resinification extent amounted to 60 percent of the total film weight at a Darr moisture of 5 percent.

The embodiments of the invention in which an exclusive property or privilege is claimed are defined as follows:

1. In process of curing a melamine-formaldehyde or urea-formaldehyde resin in the presence of a hardener, the improvement which comprises that the hardener is N-methylethanolamine acetate or di[N-methyl-ethanolamine]-oxalate.

2. The improvement as claimed in claim 1, wherein about between 0.05–1.0 percent by weight of said hardener is admixed with the aminoplast prior to curing.

3. In a process of curing a melamine-formaldehyde or urea-formaldehyde resin in the presence of a hardener, wherein the hardener is admixed with the resin prior to curing in the form of a solid or in the form of an aqueous solution, the improvement which comprises that the hardener is N-methylethanolamine acetate or di[N-methyl-ethanolamine]-oxalate.

* * * * *